(12) United States Patent
Nakano et al.

(10) Patent No.: US 7,300,969 B2
(45) Date of Patent: Nov. 27, 2007

(54) PRELIMINARY SILICA DISPERSION, FINE SILICA DISPERSION, INK RECEIVING LAYER COATING SOLUTION AND INK JET RECORDING MEDIUM

(75) Inventors: Ryoichi Nakano, Shizuoka-ken (JP); Shinji Fujimoto, Shizuoka-ken (JP); Masanobu Takashima, Shizuoka-ken (JP)

(73) Assignee: Fujifilm Corporation, Tokyo (JP)

( * ) Notice: Subject to any disclaimer, the term of this patent is extended or adjusted under 35 U.S.C. 154(b) by 350 days.

(21) Appl. No.: 10/882,297

(22) Filed: Jul. 2, 2004

(65) Prior Publication Data

US 2005/0003114 A1 Jan. 6, 2005

(30) Foreign Application Priority Data

Jul. 3, 2003 (JP) .............................. 2003-191028

(51) Int. Cl.
C08F 220/04 (2006.01)
C08J 3/00 (2006.01)
C08K 3/34 (2006.01)
C08K 5/05 (2006.01)
C08L 39/00 (2006.01)

(52) U.S. Cl. ...................... 524/492; 524/379; 524/386; 524/388; 524/389; 524/493; 524/503; 524/516; 524/521; 524/555; 427/243; 427/245; 427/385.5; 428/32.1; 428/32.17; 428/32.25; 428/32.29; 428/32.34; 428/32.36

(58) Field of Classification Search ................ 524/492, 524/493, 379, 386, 388, 389, 503, 516, 521, 524/555; 427/243, 245, 385.5; 428/32.1, 428/32.17, 32.25, 32.29, 32.34, 32.36
See application file for complete search history.

(56) References Cited

U.S. PATENT DOCUMENTS

2003/0118791 A1* 6/2003 Yoshimura et al. ......... 428/195

FOREIGN PATENT DOCUMENTS

| JP | 10-203006 A | 8/1998 |
|---|---|---|
| JP | 10-217601 A | 8/1998 |
| JP | 11-020306 A | 1/1999 |
| JP | 2000-211235 A | 8/2000 |
| JP | 2002-047454 A | 2/2002 |
| JP | 2002-052811 A | 2/2002 |
| JP | 2002-079741 A | 3/2002 |
| JP | 2002-337449 A | 11/2002 |

* cited by examiner

*Primary Examiner*—Patrick Niland
(74) *Attorney, Agent, or Firm*—Sughrue Mion, PLLC

(57) ABSTRACT

An ink jet recording medium including an ink receiving layer disposed on at least one side of a support, wherein the ink receiving layer is formed by applying an ink receiving layer coating solution. The ink receiving layer coating solution includes a water-soluble resin and a fine silica dispersion that has been prepared by finely dispersing a preliminary silica dispersion. The preliminary silica dispersion includes fumed silica, a cationic polymer having an I/O value of 2.4 or less, and alcohol.

15 Claims, No Drawings

PRELIMINARY SILICA DISPERSION, FINE SILICA DISPERSION, INK RECEIVING LAYER COATING SOLUTION AND INK JET RECORDING MEDIUM

CROSS-REFERENCE TO RELATED APPLICATION

This application claims priority under 35USC 119 from Japanese Patent Application No. 2003-191028, the disclosure of which is incorporated by reference herein.

BACKGROUND OF THE INVENTION

1. Field of the Invention

The present invention relates to a preliminary dispersion used in an ink receiving layer coating solution for forming an ink receiving layer of an ink jet recording medium, a fine particle dispersion including the preliminary dispersion dispersed further finely therein for use in an ink receiving layer coating solution, and an ink receiving layer coating solution including a binder, etc. added to the dispersion, and also to an ink jet recording medium having an ink receiving layer formed using the ink receiving layer coating solution.

2. Description of the Related Art

As the information technology (IT) industry has advanced rapidly in recent years, various information processing systems have been developed, and recording methods and recording devices suitable for the information processing systems have also been developed and practically used. Among the recording methods, an ink jet recording method is used widely not only in offices but also in homes because various kinds of recording materials can be used in recording, and the hardware (device) used therein is relatively inexpensive, compact and very quiet.

Along with higher resolutions attained by ink jet printers in recent years, various recording materials have been developed to realize photograph-like high-quality prints, etc. From the viewpoint of providing the recording materials with commercial value, it is required that the materials are excellent in ink absorptivity and in storage of images after printing, that is, the images are free of discoloration in long term storage and the ink does not smear thus preventing deterioration of the quality of the images.

An ink jet recording sheet provided with an ink receiving layer having a 3-dimensional structure with a high void volume, formed from fine inorganic pigment particles such as fumed silica and a water-soluble resin such as polyvinyl alcohol, is disclosed as a sheet with improved ink absorption (see, for example, Japanese Patent Application Laid-Open (JP-A) Nos. 10-203006, 10-217601 and 11-20306), by which an image of high resolution can be formed.

The ink receiving layer is formed by coating a support with an ink receiving layer coating solution, and this coating solution is usually prepared by preparing a preliminary dispersion consisting of a kneaded product of fine inorganic pigment particles, then dispersing the preliminary dispersion further finely to form a fine inorganic pigment particle dispersion, and adding a binder, a mordant, a crosslinking agent, etc. to the fine inorganic pigment particle dispersion to prepare an ink receiving layer coating solution.

As one kind of the inorganic pigment, fumed silica consists of very fine particles, and thus the interaction among the particles is strong, and when fumed silica is added to and mixed with a dispersing medium such as water, the resulting dispersion has a pH of 4 to 5 and simultaneously exhibits thixotropic properties so that after being mixed and dispersed, the dispersion has a high viscosity and is poor in handlability. When the preliminary dispersion of high viscosity is further finely dispersed, the viscosity of the resulting dispersion also tends to be high. Accordingly, when the fumed silica is used as an inorganic pigment added to the ink receiving layer, it is not easy to prepare the preliminary dispersion and the dispersion.

Accordingly, there are known a method of producing a fine silica dispersion, which includes dispersing fumed silica in water to prepare a preliminary silica dispersion, then adding a boric acid compound and cationic polymer P-1 (with an I/O value of 4.3) thereto to adjust pH thereof to 5 to 8, and dispersing the dispersion further finely (paragraphs 0043 to 0045 of JP-A No. 2002-79741), and a method of producing a fine silica dispersion, which includes adding water, boric acid and borax to fumed silica, kneading and dispersing the mixture at pH 5 to 8 to prepare a preliminary silica dispersion, adding cationic polymer P-1 thereto, and dispersing the dispersion further finely (paragraphs 0046 to 0049 of JP-A No. 2002-79741).

However, when an image is recorded on an ink jet recording sheet prepared by using the preliminary silica dispersion or the fine silica dispersion, there is a problem of blurring, and in the above method using borax, sodium is contained in the ink receiving layer, and thus when an image is recorded thereon, there arises a problem of deterioration due to further blurring.

JP-A No. 2000-211235 (paragraphs 0056 to 0057) discloses using a mixed solvent of water and ethanol and adding a cationic polymer having an I/O value of 2.5 to prepare a preliminary silica dispersion. Further, JP-A No. 2002-52811 discloses adding a cationic polymer having an I/O value of 2.4 or less to prepare a preliminary silica dispersion. However, a preliminary silica dispersion of low viscosity cannot be obtained by using only the alcohol or only the cationic polymer having an I/O value of 2.4 or less.

SUMMARY OF THE INVENTION

The present invention has been made in view of the above-described circumstances and provides a preliminary dispersion and a fine particle dispersion which are excellent in handlability. The present invention also provides an ink receiving layer coating solution using the dispersion as well as an ink jet recording medium having an ink receiving layer formed using the coating solution.

The problem can be solved by providing a preliminary silica dispersion, a fine silica dispersion, an ink receiving layer coating solution and an ink jet recording medium described below.

A first aspect of the present invention is to provide a preliminary silica dispersion to be used in an ink receiving layer coating solution for forming an ink receiving layer of an ink jet recording medium. The preliminary silica dispersion includes fumed silica, a cationic polymer having an I/O value of 2.4 or less, and alcohol.

The average primary particle diameter of the fumed silica may be 5 to 30 nm.

A second aspect of the present invention is to provide a fine silica dispersion to be used in an ink receiving layer coating solution for forming an ink receiving layer of an ink jet recording medium. The fine silica dispersion is prepared by further finely dispersing the preliminary silica dispersion of the first aspect.

A third aspect of the present invention is to provide an ink receiving layer coating solution for forming an ink receiving layer of an ink jet recording medium. The ink receiving layer coating solution includes the fine silica dispersion of the second aspect and at least a water-soluble resin.

A fourth aspect of the present invention is to provide an ink jet recording medium having an ink receiving layer disposed on at least one side of a support. The ink receiving layer is formed by applying the ink receiving layer coating solution of the third aspect.

When the ink receiving layer is produced by curing by crosslinking of a coating layer formed by applying the ink receiving layer coating solution, the curing by crosslinking may be carried out by adding a basic solution having a pH of 7 or more to the coating layer either (1) while the coating layer is being formed by applying the ink receiving layer coating solution or (2) before the coating layer formed by applying the ink receiving layer coating solution exhibits a decreasing rate of drying during drying of the coating layer.

A fifth aspect of the present invention is to provide a method of producing an ink jet recording medium, including: kneading fumed silica with a cationic polymer having an I/O value of 2.4 or less and alcohol to prepare a preliminary silica dispersion; further finely dispersing the preliminary silica dispersion to form a fine silica dispersion; adding at least a water-soluble resin to the fine silica dispersion to prepare an ink receiving layer coating solution; coating at least one side of a support with the ink receiving layer coating solution to form a coating layer; and curing the coating layer by crosslinking by applying a basic solution having a pH of 7 or more on the coating layer either (1) while the coating layer is being formed by applying the ink receiving layer coating solution or (2) before the coating layer formed by applying the ink receiving layer coating solution exhibits a decreasing rate of drying during drying of the coating layer.

DETAILED DESCRIPTION OF THE INVENTION

[A Preliminary Silica Dispersion and a Fine Silica Dispersion to be Used in an Ink Receiving Layer Coating Solution for Forming an Ink Jet Recording Medium Ink Receiving Layer]

The preliminary silica dispersion of the present invention contains fumed silica, a cationic polymer having an I/O value of 2.4 or less, and alcohol. The preliminary silica dispersion can be produced by kneading fumed silica with the cationic polymer having an I/O value of 2.4 or less and the alcohol. This preliminary silica dispersion is dispersed further finely to prepare a fine silica dispersion. This fine silica dispersion is used to produce an ink receiving layer coating solution for forming an ink jet recording medium ink receiving layer.

When fumed silica is added to water, the resulting dispersion shows thixotropic properties to deteriorate handlability. However, when fumed silica is kneaded in the presence of a cationic polymer having an I/O value of 2.4 or less and alcohol as described above, a preliminary silica dispersion of low viscosity can be obtained without increasing viscosity. When the preliminary silica dispersion is further finely dispersed to prepare a fine silica dispersion, the preliminary silica dispersion obtained in the manner described above is excellent in handlability to facilitate the dispersion treatment.

An ink receiving layer coating solution prepared by using the preliminary silica dispersion and the fine silica dispersion of the invention is excellent in coating properties with low viscosity.

The preliminary dispersion of the invention is obtained by adding fine fumed silica particles to an aqueous solution containing a cationic polymer having an I/O value of 2.4 or less and alcohol and kneading the mixture. The method of preparing the aqueous solution is not particularly limited, and the fine fumed silica particles may be added as such or in the form of an aqueous dispersion. Kneading is carried out with a high-speed rotating stirring machine.

The "preliminary dispersion" of fumed silica in the invention refers to a dispersion obtained by merely dispersing fumed silica in an aqueous solution such that fine fumed silica particles do not float or aggregate in the resulting dispersion.

The fine particle dispersion of the invention is obtained by dispersing the preliminary dispersion further finely with a dispersing machine such that the ratio of coarse particles having a volume-average particle diameter of 5 μm or more in the preliminary dispersion, as determined by a particle-diameter measuring instrument (for example LA910 manufactured by HORIBA, Ltd.), is reduced to 5% or less.

Formation of fine particles is carried out by dispersing the preliminary dispersion finely with a dispersing machine, and as the dispersing machine, use can be made of various dispersing machines known in the art, such as a high-speed revolution dispersing machine, a medium stirring dispersing machine (ball mill, sand mill, etc.), an ultrasonic dispersing machine, a colloid mill dispersing machine and a high-pressure dispersing machine. The medium stirring dispersing machine, colloid mill dispersing machine or high-pressure dispersing machine is preferably used from the viewpoint of efficiently dispersing coarse particles formed.

Hereinafter, the fumed silica, the cationic polymer and the alcohol used in the preliminary silica dispersion are described in detail.

(Fumed Silica)

Generally, fine silica particles are classified roughly into wet process particles and dry process (vapor phase process) particles, depending on the process for producing silica, and the fumed silica in the invention is dry process (vapor phase process) particles. A wet process mainly used at present is a process involving hydrolysis of silicon halides in a vapor phase at high temperatures (flame hydrolysis process) or a process involving heating, reducing and gasifying borax and coke by an arc in an electric oven and oxidizing the resulting gas with air (arc process) to form anhydrous silica, and the "fumed silica" refers to fine anhydrous silica particles obtained by the vapor phase process. In a wet process mainly used at present, activated silica is formed by acid degradation of silicate and then suitably polymerized to precipitate aggregates to give hydrous silica, and this hydrous silica may be used in combination with the fumed silica.

The fumed silica is different from the hydrous silica in the density of silanol groups on the surface, in the presence of pores, etc. to show different properties, and is suitable for formation of a 3-dimensional structure of high porosity. The reason for this is not evident, but is possibly because the hydrous silica has a high density of 5 to 8 silanol groups/nm$^2$ on the surface of the fine particles, and thus the fine silica particles are easily densely aggregated, while the fumed silica has a low density of 2 to 3 silanol groups/nm$^2$ on the surface of the fine particles, and is thus sparsely flocculated to form a structure of high porosity.

The fumed silica has a particularly large specific surface area, and is thus characterized by high ink absorptivity, high retention efficiency and low refractive index, thus endowing the ink receiving layer with transparency upon being dispersed to a suitable particle diameter and attaining high color density and excellent color property. The fact that the receiving layer is transparent is important for attaining high color density and excellent coloring gloss for use in photo gloss paper, etc.

The average primary particle diameter of the fumed silica is preferably 5 to 30 nm, and more preferably 5 to 10 nm. Particles of the fumed silica easily adhere to one another via hydrogen bonds between silanol groups so that when the average primary particle diameter is 30 nm or less, the fumed silica can form a structure of high porosity to improve ink adsorptivity effectively, and simultaneously the transparency and surface gloss of the ink receiving layer can be improved. The fumed silica may be used in the form of primary particles or after formation of secondary particles.

The fumed silica is used preferably in a dispersed state. The fumed silica can be dispersed with a cationic resin described later as a dispersant (aggregation inhibitor), and can be used as a fumed silica dispersion.

Other fine inorganic particles can be used in combination with the fumed silica. The other fine inorganic particles include, for example, fine particles of other silica, colloidal silica, titanium dioxide, barium sulfate, calcium silicate, zeolite, kaolinite, halloysite, mica, talc, calcium carbonate, magnesium carbonate, calcium sulfate, zinc oxide, zinc hydroxide, alumina, aluminum silicate, calcium silicate, magnesium silicate, zirconium oxide, zirconium hydroxide, cerium oxide, lanthanum oxide and yttrium oxide. These fine particles can be contained in the form of primary particles or secondary particles, and the average primary particle diameter is preferably 2 μm or less, and more preferably 200 nm or less.

The total content (solid content) of the fumed silica (and other fine inorganic particles if necessary) in the ink receiving layer is preferably 60% by mass or more, and more preferably 65% by mass or more. A total content of 60% by mass or more is preferable because a further excellent porous structure can be formed to provide an ink jet recording medium with sufficient ink absorptivity. The amount (solid content) in the ink receiving layer is an amount determined on the basis of non-water components in the composition constituting the ink receiving layer.

When the fumed silica (and other fine inorganic particles if necessary) is used in the ink jet recording medium, the silica can also be used preferably in embodiments described in for example JP-A Nos. 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777 and 2001-301314.

For the purpose of improving dispersibility, the surface of the fine fumed silica particles may be treated with a silane coupling agent. The silane coupling agent is preferably the one having organic functional groups (for example, a vinyl group, amino group, epoxy group, mercapto group, chloro group, alkyl group, phenyl group, ester group, etc.) in addition to a site for coupling treatment.

(Cationic Polymer Having an I/O Value of 2.4 or Less)

In the invention, the I/O value is a parameter indicative of the degree of hydrophilicity/lipophilicity of compounds or substituent groups, and is detailed in Organic Conceptual View (in Japanese) (authored by Yoshio Koda and published in 1984 by Sankyo Shuppan). I indicates inorganic nature, while O indicates organic nature, and a higher I/O value indicates higher inorganic nature (higher polarity and hydrophilicity).

The I/O value of the cationic polymer can be regulated by suitably changing the balance between hydrophilicity and hydrophobicity of groups contained in the polymer. For example, the I/O value can be regulated by considering the degree of hydrophobicity or hydrophilicity of a monomer when the cationic polymer is a homopolymer, or by changing the copolymerizing ratio of a hydrophobic group-containing monomer to a hydrophilic group-containing monomer when the cationic polymer is a copolymer.

As the cationic polymer having an I/O value of 2.4 or less used in the invention, a homopolymer of a cationic monomer described below or a copolymer of the cationic monomer with another non-cationic monomer is used.

The cationic monomer includes, for example, trimethyl-p-vinylbenzyl ammonium chloride, trimethyl-m-vinylbenzyl ammonium chloride, triethyl-p-vinylbenzyl ammonium chloride, triethyl-m-vinylbenzyl ammonium chloride, N,N-dimethyl-N-ethyl-N-p-vinylbenzyl ammonium chloride, N,N-diethyl-N-methyl-N-p-vinylbenzyl ammonium chloride, N,N-dimethyl-N-n-propyl-N-p-vinylbenzyl ammonium chloride, N,N-dimethyl-N-n-octyl-N-p-vinylbenzyl ammonium chloride, N,N-dimethyl-N-benzyl-N-p-vinylbenzyl ammonium chloride, N,N-diethyl-N-benzyl-N-p-vinylbenzyl ammonium chloride, N,N-dimethyl-N-(4-methyl) benzyl-N-p-vinylbenzyl ammonium chloride, N,N-dimethyl-N-phenyl-N-p-vinylbenzyl ammonium chloride; trimethyl-p-vinylbenzyl ammonium bromide, trimethyl-m-vinylbenzyl ammonium bromide, trimethyl-p-vinylbenzyl ammonium sulfonate, trimethyl-m-vinylbenzyl ammonium sulfonate, trimethyl-p-vinylbenzyl ammonium acetate, trimethyl-m-vinylbenzyl ammonium acetate, N,N,N-triethyl-N-2-(4-vinylphenyl)ethyl ammonium chloride, N,N,N-triethyl-N-2-(3-vinylphenyl)ethyl ammonium chloride, N,N-diethyl-N-methyl-N-2-(4-vinylphenyl)ethyl ammonium chloride, N,N-diethyl-N-methyl-N-2-(4-vinylphenyl)ethyl ammonium acetate; and quaternary products, with methyl chloride, ethyl chloride, methyl bromide, ethyl bromide, methyl iodide or ethyl iodide, of N,N-dimethylamonoethyl (meth)acrylate, N,N-diethylaminoethyl (meth)acrylate, N,N-dimethylamonopropyl (meth)acrylate, N,N-diethylaminopropyl (meth)acrylate, N,N-dimethylaminoethyl (meth)acrylamide, N,N-diethylamionoethyl (meth)acrylamide, N,N-dimethylaminopropyl (meth)acrylamide or N,N-diethylaminopropyl (meth)acrylamide, as well as their sulfonates, alkyl sulfonates, acetates or alkyl carboxylates whose anions are substituted.

Concrete examples of the cationic monomer include monomethyldiallyl ammonium chloride, trimethyl-2-(methacryloyloxy)ethyl ammonium chloride, triethyl-2-(methacryloyloxy)ethyl ammonium chloride, trimethyl-2-(acryloyloxy)ethyl ammonium chloride, triethyl-2-(acryloyloxy) ethyl ammonium chloride, trimethyl-3-(methacryloyloxy) propyl ammonium chloride, triethyl-3-(methacryloyloxy) propyl ammonium chloride, trimethyl-2-(methacryloylamino)ethyl ammonium chloride, triethyl-2-(methacryloylamino)ethyl ammonium chloride, trimethyl-2-(acryloylamino)ethyl ammonium chloride, triethyl-2-(acryloylamino)ethyl ammonium chloride, trimethyl-3-(methacryloylamino)propyl ammonium chloride, triethyl-3-(methacryloylamino)propyl ammonium chloride, trimethyl-3-(acryloylamino)propyl ammonium chloride, triethyl-3-(acryloylamino)propyl ammonium chloride; N,N-dimethyl-N-ethyl-2-(methacryloyloxy)ethyl ammonium chloride, N,N-diethyl-N-methyl-2-(methacryloyloxy)ethyl ammonium chloride, N,N-dimethyl-N-ethyl-3-(acryloyloxylamino)propyl ammonium chloride, trimethyl-2-(methacryloyloxy)ethyl ammonium bromide, trimethyl-3-

(acryloylamino)propyl ammonium bromide, trimethyl-2-(methacryloyloxy)ethyl ammonium sulfonate, trimethyl-3-(acryloylamino)propyl ammonium acetate, etc.

Other copolymerizable monomers such as N-vinylimidazole, N-vinyl-2-methylimidazole can also be mentioned.

The non-cationic monomer includes, for example, (meth)acrylates; cycloalkyl (meth)acrylates such as cyclohexyl (meth)acrylate; aryl (meth)acrylates such as phenyl (meth)acrylate; aralkyl esters such as benzyl (meth)acrylate; aromatic vinyls such as styrene, vinyl toluene and α-methyl styrene; vinyl esters such as vinyl acetate and vinyl propionate; allyl esters such as allyl acetate; halogen-containing monomers such as vinylidene chloride and vinyl chloride; vinyl cyanides such as (meth)acrylonitrile; and olefins such as ethylene and propylene.

The alkyl (meth)acrylates are preferably alkyl (meth)acrylates whose alkyl moiety contains 1 to 18 carbon atoms, such as methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate and stearyl (meth)acrylate.

The amount of the cationic polymer added is preferably about 1 to 15% by mass, and more preferably 2 to 10% by mass, based on an amount of the fumed silica.

(Alcohol)

The alcohol used in the invention may be a monovalent or divalent or more alcohol, and the number of carbon atoms in the alcohol is preferably 1 to 10, and more preferably 1 to 5. Examples of the alcohol include methanol, ethanol, n-propyl alcohol, iso-propyl alcohol, methoxy propanol, ethylene glycol, glycerin, etc.

The amount of the alcohol added is preferably 0.1 to 20% by mass based on a solid content of the cationic polymer.

When the preliminary dispersion is prepared, various additives can be added. The additives include, for example, a wide variety of nonionic or cationic surfactants (anionic surfactants are not preferable because they form aggregates), defoaming agents, nonionic hydrophilic polymers (polyvinyl alcohol, polyvinyl pyrrolidone, polyethylene oxide, polyacrylamide, various sugars, gelatin, pullulan, etc.), non-ionic or cationic latex dispersions, water-miscible organic solvents (ethyl acetate, methanol, ethanol, isopropanol, n-propanol, acetone, etc.), inorganic salts, pH adjusting agents, etc., and these can be used suitably as necessary.

In particular, the water-miscible organic solvent is preferably used in respect of inhibition of formation of fine aggregates upon mixing the fumed silica with the cationic resin. The water-miscible organic solvent is used preferably in an amount of 0.1 to 20% by mass, and more preferably 0.5 to 10% by mass, in the dispersion.

[Ink Receiving Layer Coating Solution for Forming an Ink Jet Recording Medium Ink Receiving Layer]

The ink receiving layer coating solution is prepared by adding predetermined components necessary for the ink receiving layer to the fine dispersion and then mixing them. The components include a water-soluble resin necessary as a binder, as well as a crosslinking agent for the water-soluble resin, a mordant, etc.

When the ink receiving layer coating solution is prepared, the dispersing machine used in preparing the fine dispersion can be used to disperse the coating solution.

(Water-Soluble Resin)

The ink receiving layer coating solution according to the invention includes a water-soluble resin.

The water-soluble resin includes, for example, polyvinyl alcohol-based resin that is a resin having a hydroxy group as a hydrophilic structural unit (polyvinyl alcohol [PVA], acetoacetyl-modified polyvinyl alcohol, cation-modified polyvinyl alcohol, anion-modified polyvinyl alcohol, silanol-modified polyvinyl alcohol, polyvinyl acetal, etc.), cellulose resin (methyl cellulose [MC], ethyl cellulose [EC], hydroxyethyl cellulose [HEC], carboxymethyl cellulose [CMC], hydroxypropyl cellulose [HPC], hydroxyethylmethyl cellulose, hydroxypropylmethyl cellulose, etc.), chitin or derivatives thereof, chitosan or derivative thereof, starch, ether linkage-containing resin (polyethylene oxide [PEO], polypropylene oxide [PPO], polyethylene glycol [PEG], polyvinyl ether [PVE], etc.), and carbamoyl-containing resin (polyacrylamide [PAAM], polyvinylpyrrolidone [PVP], polyacrylate hydrazide, etc.). Mention can also be made of resins containing a carboxyl group as a dissociable group, such as polyacrylate, maleic resin, alginate and gelatin.

Among those described above, the type of water-soluble resin combined with the fumed silica is important from the viewpoint of the transparency and coating formability of the layer, and particularly polyvinyl alcohol-based resin is preferable.

Examples of the polyvinyl alcohol include those described in JP-B Nos. 4-52786, 5-67432, 7-29479, Japanese Patent No. 2537827, JP-B No. 7-57553, Japanese Patent Nos. 2502998, 3053231, JP-A No. 63-176173, Japanese Patent No. 2604367, JP-A Nos. 7-276787, 9-207425, 11-58941, 2000-135858, 2001-205924, 2001-287444, 62-278080, 9-39373, Japanese Patent No. 2750433, 2000-158801, 2001-213045, 2001-328345, 8-324105, 11-348417, etc.

In particular, the polyvinyl alcohol-based resin having a degree of saponification of 90% or more, particularly 95% or more, is preferable. When the degree of saponification is less than 90%, the viscosity of the ink receiving layer-forming coating solution is high to make application difficult, thus making formation of the layer impossible in some cases.

The polyvinyl alcohol-based resin has a hydroxyl group in the structural unit, and this hydroxyl group forms a hydrogen bond with a silanol group on the surface of the fumed silica, thus facilitating formation of a 3-dimensional network including secondary fine silica particles as chain units. It is estimated that the ink receiving layer having a porous structure of high porosity and sufficient strength can be formed by formation of the 3-dimensional network. As described above, the porous ink receiving layer can absorb an ink rapidly by the capillary phenomenon to form dots excellent in circularity without ink blurring.

The water-soluble resins may be used alone or as a mixture of two or more thereof. The content of the water-soluble resin in the ink receiving layer is preferably 9 to 40% by mass, and more preferably 12 to 33% by mass, based on the solid content (mass) of the layer.

The polyvinyl alcohol-based resin and the other water-soluble resin described above may be simultaneously used. When they are used simultaneously, the content of the polyvinyl alcohol-based resin is preferably 50% by mass or more, and more preferably 70% by mass or more, based on the total content of the water-soluble resins.

<Ratio of the Fumed Silica to the Water-Soluble Resin>

The ratio of the fumed silica (x) to the water-soluble resin (y) [PB ratio (x/y)] affects a significant influence on the structure and strength of the ink receiving layer. That is, when the mass ratio [PB ratio] is increased, the porosity, void volume and surface area (per unit area) are increased, but the density and strength tend to be lowered. If the PB ratio (x/y) is too high, the strength of the resulting coating is deteriorated, and cracking occurs, while if the PB ratio is too small, the pores are easily clogged with the resin to reduce porosity thereby reducing ink absorptivity. From the viewpoint of preventing these problems, the PB ratio is preferably 1.5 to 10.

Because the recording medium passing through a transfer system in an ink jet printer may undergo stress, the ink receiving layer should have sufficient strength. To prevent cracking and removal of the ink receiving layer upon being cut into sheets, the ink receiving layer should have sufficient strength. In this respect, the PB (x/y) ratio is preferably 5 or less, while the PB ratio is preferably 2 or more from the viewpoint of securing high-speed ink absorption in an ink jet printer.

For example, when a coating solution wherein the fumed silica having an average primary particle diameter of 20 nm or less and the water-soluble resin were completely dispersed in a PB ratio (x/y) of 2 to 5 in an aqueous solution is applied onto a support and the coating layer is dried, a 3-dimensional network having secondary particles of the fine silica particles as network chains can be formed to facilitate formation of a light-permeable porous coating having an average pore diameter of 30 nm or less, a porosity of 50 to 80%, a void volume of at least 0.5 ml/g and a specific surface area of at least 100 m$^2$/g.

(Crosslinking Agent)

The ink receiving layer coating solution in the invention preferably includes a crosslinking agent capable of crosslinking the water-soluble resin.

A boron compound is used preferably to crosslink the water-soluble resin, particularly the polyvinyl alcohol-based resin. The boron compound includes, for example, borax, boric acid, borate (for example, orthoborate, $InBO_3$, $ScBO_3$, $YBO_3$, $LaBO_3$, $Mg_3(BO_3)_2$, $CO_3(BO_3)_2$, diborate (for example, $Mg_2B_2O_5$, $CO_2B_2O_5$), metaborate (for example, $LiBO_2$, $Ca(BO_2)_2$, $NaBO_2$, $KBO_2$), tetraborate (for example, $Na_2B_4O_7 \cdot 10H_2O$), pentaborate (for example, $KB_5O_8 \cdot 4H_2O$, $Ca_2B_6O_{11} \cdot 7H_2O$, $CsB_5O_5$), etc. Among these compounds, borax, boric acid and borate are preferable, and boric acid is particularly preferable to cause the crosslinking reaction rapidly.

Compounds other than the boron compound can also be used. Example of such compounds include aldehyde compounds such as formaldehyde, glyoxal and glutaraldehyde; ketone compounds such as diacetyl and cyclopentanedione; activate halogenated compounds such as bis(2-chloroethy-lurea)-2-hydroxy-4,6-dichloro-1,3,5-triazine, 2,4-dichloro-6-S-triazine sodium salt; activate vinyl compounds such as divinylsulfonic acid, 1,3-vinylsulfonyl-2-propanol, N,N'-ethylenebis(vinylsulfonylacetamide) and 1,3,5-triacryloyl-hexahydro-S-triazine; N-methylol compounds such as dimethylol urea and methylol dimethyl hydantoin; melamine compounds (for example, methylol melamine, alkylated methylol melamine); epoxy resin; isocyanate compounds such as 1,6-hexamethylene diisocyanate; aziridine compounds described in U.S. Pat. No. 3,017,280 and U.S. Pat. No. 2,983,611; carboxyimide compounds described in U.S. Pat. No. 3,100,704; epoxy compounds such as glycerol triglycidyl ether; ethyleneimino compounds such as 1,6-hexamethylene-N,N'-bisethylene urea; halogenated carboxyaldehyde compounds such as mucochloric acid and mucophenoxychloric acid; dioxane compounds such as 2,3-dihydroxydioxane; metal-containing compounds such as titanium lactate, aluminum sulfate, chrome alum, potassium alum, zirconium acetate and chromium acetate; polyamine compounds such as tetraethylene pentamine; hydrazide compounds such as adipate dihydrazide; and a low molecule or a polymer having two or more oxazoline groups. These crosslinking agents can be used alone or as a mixture of two or more thereof.

The amount of the crosslinking agent used is preferably 1 to 50% by mass, and more preferably 5 to 40% by mass, based on the water-soluble resin in the layer.

(Mordant)

The mordant is preferably an organic mordant such as a cationic polymer (cationic mordant) or an inorganic mordant such as a water-soluble metal compound. The mordant is contained in the ink receiving layer to interact with a liquid ink having an anionic dye as a colorant thereby stabilizing the dye to achieve an image of high density and simultaneously preventing blurring with time and improving water resistance.

As the cationic mordant, a polymer mordant having a primary to tertiary amino group or a quaternary ammonium base as a cationic functional group is preferably used, but a cationic non-polymer mordant can also be used.

The polymer mordant is preferably a homopolymer of a monomer (mordant monomer) having a primary to tertiary amino group or a salt thereof or a quaternary ammonium base or a copolymer of the mordant monomer and another monomer (referred to hereinafter as "non-mordant monomer") or a polycondensate thereof. These polymer mordants can be used in the form of a water-soluble polymer or water-dispersible latex particles.

The mordant monomer includes the cationic monomers mentioned above in the description of the cationic polymer. Not only the cationic monomers but also allyl amine, diallyl amine, derivatives thereof, and salts thereof can be used. Examples of such compounds include allyl amine, allylamine hydrochloride, allylamine acetate, allylamine sulfate, diallyl amine, diallylamine hydrochloride, diallylamine acetate, diallylamine sulfate, diallyl methylamine and salts thereof (for example, hydrochloride, acetate, sulfate, etc.), diallyl ethylamine and salts thereof (for example, hydrochloride, acetate, sulfate, etc.) and diallyldimethyl ammonium salts (whose counter-anions are chloride, acetate ions, sulfate ions, etc.). These allyl amine and diallyl amine derivatives in an amine form are inferior in polymerizability, and are thus desalted if necessary in a general production process.

A mordant obtained by polymerizing a polymer unit such as N-vinyl acetamide or N-vinyl formamide followed by hydrolysis thereof to give a polymer including a vinyl amine unit, or a salt thereof, can also be used.

The non-mordant monomer refers to a monomer not containing a basic or cationic moiety such as a primary to tertiary amino group or a salt thereof or a quaternary ammonium base and not interacting or substantially not interacting with a dye in an ink for ink jetting.

The non-mordant monomers include the non-cationic monomers mentioned above in the description of the cationic polymer. The non-mordant monomers can be used alone or as a mixture of two or more thereof.

Preferable examples of the polymer mordant include cationic dicyan resin represented by polydiallyldimethyl ammonium chloride, polymethacryloyloxyethyl-β-hydroxyethyldimethyl ammonium chloride, polyethylene imine, polyallylamine and derivatives thereof, polyamide-polyamine resin, cationic starch, dicyandiamide formalin condensates, dimethyl-2-hydroxypropyl ammonium salt polymers, polyamidine, polyvinylamine, and dicyandiamide-formalin polycondensates, cationic polyamine resin represented by dicyanamide-diethylene triamine polycondensates, as well as epichlorohydrin-dimethylamine addition polymers, dimethyldiallyl ammonium chloride-$SO_2$ copolymers and diallylamine salt-$SO_2$ copolymers.

Specifically, the polymer mordant includes those described in JP-A Nos. 48-28325, 54-74430, 54-124726,55-22766, 55-142339,60-23850, 60-23851, 60-23852, 60-23853, 60-57836, 60-60643, 60-118834, 60-122940, 60-122941, 60-122942, 60-235134, 1-161236, U.S. Pat. Nos. 2,484,430, 2,548,564, 3,148,061, 3,309,690, 4,115,124, 4,124,386, 4,193,800, 4,273,853, 4,282,305, 4,450,224, JP-A Nos. 1-161236, 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777 and 2001-301314. In particular, polyallylamine and its derivatives are preferable.

The inorganic mordant include polyvalent water-soluble metal salts and hydrophobic metal salt compounds. Examples of such inorganic mordants include salts or complexes of a metal selected from magnesium, aluminum, calcium, scandium, titanium, vanadium, manganese, iron, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten and bismuth.

Examples of such compounds include calcium acetate, calcium chloride, calcium formate, calcium sulfate, barium acetate, barium sulfate, barium phosphate, manganese chloride, manganese acetate, manganese formate.$2H_2O$, ammonium manganese sulfate.$6H_2O$, cupper(II) chloride, cupper (II) ammonium chloride.$2H_2O$, copper sulfate, cobalt chloride, cobalt thiocyanate, cobalt sulfate, nickel sulfate.$6H_2O$, nickel chloride.$6H_2O$, nickel acetate.$4H_2O$, ammonium nickel sulfate.$6H_2O$, nickel amidosulfate.$4H_2O$, alumina sulfate, alumina alum, basic polyalumina hydroxide, alumina sulfite, alumina thiosulfate, polyalumina chloride, alumina nitrate.$9H_2O$, alumina chloride.$6H_2O$, ferrous bromide, ferrous chloride, ferric chloride, ferrous sulfate, ferric sulfate, zinc phenolsulfonate, zinc bromide, zinc chloride, zinc nitrate.$6H_2O$, zinc sulfate, titanium tetrachloride, tetraisopropyl titanate, titanium acetylacetonate, titanium lactate, zirconium acetylacetonate, zirconyl acetate, zirconyl sulfate, ammonium zirconium carbonate, zirconyl stearate, zirconyl octylate, zirconyl nitrate, zirconium oxychloride, zirconium hydroxychloride, chromium acetate, chromium sulfate, magnesium sulfate, magnesium chloride.$6H_2O$, magnesium citrate.$9H_2O$, sodium phosphotungstate, tungsten sodium citrate, 12-tungustophosphoric acid.$nH_2O$, 12-tungstosilicic acid.$26H_2O$, molybdenum chloride, 12-molybdophoshoric acid.$nH_2O$, potassium nitrate, manganese acetate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodymium nitrate, neodymium nitrate, samarium nitrate, europium nitrate, gadolinium nitrate, dysprosium nitrate, erbium nitrate, ytterbium nitrate, hafnium chloride and bismuth nitrate.

The inorganic mordant described above is preferably an alumina-containing compound, a titanium-containing compound, a zirconium-containing compound, or a compound (salt or complex) of the group IIIB metals in the periodic table.

The content of the mordant in the ink receiving layer is preferably 0.01 to 5 $g/m^2$, and more preferably 0.1 to 3 $g/m^2$.

If necessary, the ink receiving layer coating solution can further contain a wide variety of known additives such as an acid, a UV absorber, an antioxidant, a fluorescent brightener, a monomer, a polymerization initiator, a polymerization inhibitor, a blurring inhibitor, a preservative, a viscosity stabilizer, a defoaming agent, a surfactant, an antistatic agent, a matting agent, a curling inhibitor and a water resistance-conferring agent.

The acid is added to the ink receiving layer coating solution to regulate the surface of the ink receiving layer in the range of pH 3 to 8, preferably pH 5 to 7.5 thereby improving the yellowing resistance of a white background. The surface pH is measured by method A (coating method) for measurement of surface pH stipulated by Japan Technical Association of the Pulp and Paper Industry (J. TAPPI). For example, a paper pH measurement set "type MPC" (KYORITSU CHEMICAL-CHECK Lab., Corp.) corresponding to the method A can be used in this measurement.

Examples of the acid include formic acid, acetic acid, glycolic acid, oxalic acid, propionic acid, malonic acid, succinic acid, adipic acid, maleic acid, malic acid, tartaric acid, citric acid, benzoic acid, phthalic acid, isophthalic acid, glutaric acid, gluconic acid, lactic acid, aspartic acid, glutamic acid, salicylic acid, metal salicylate (Zn, Al, Ca or Mg salicylate), methanesulfonic acid, itaconic acid, benzenesulfonic acid, toluenesulfonic acid, trifluoromethanesulfonic acid, styrenesulfonic acid, trifluoroacetic acid, barbituric acid, acrylic acid, methacrylic acid, cinnamic acid, 4-hydroxybenzoic acid, aminobenzoic acid, naphthalenedisulfonic acid, hydroxybenzenesulfonic acid, toluenesulfinic acid, benzenesulfinic acid, sulfanilic acid, sulfamic acid, α-resorcylic acid, β-resorcylic acid, γ-resorcylic acid, gallic acid, fluoroglycine, sulfosalicylic acid, ascorbic acid, erysorbic acid, bisphenolic acid, hydrochloric acid, nitric acid, sulfuric acid, phosphoric acid, polyphosphoric acid, boric acid and boronic acid. The amount of these acids may be determined such that the pH of the surface of the ink receiving layer is reduced to 3 to 8.

The acid may be used in the form of a metal salt (for example, a salt of sodium, potassium, calcium, cesium, zinc, copper, iron, aluminum, zirconium, lanthanum, yttrium, magnesium, strontium or cerium) or an amine salt (for example, ammonia, triethylamine, tributylamine, piperazine, 2-methylpiperazine or polyallylamine).

The UV absorber, antioxidant, and blurring inhibitor act as shelf-stability improvers and are preferable additives.

The UV absorber, antioxidant and blurring inhibitor which can be simultaneously used include alkylated phenolic compounds (including hindered phenolic compounds), alkylthiomethyl phenolic compounds, hydroquinone compounds, alkylated hydroquinone compounds, tocopherol compounds, thiodiphenyl ether compounds, compounds having two or more thioether linkages, bisphenol compounds, O-, N- and S-benzyl compounds, hydroxybenzyl compounds, triazine compounds, phosphonate compounds, acylaminophenolic compounds, ester compounds, amide compounds, ascorbic acid, amine antioxidants, 2-(2-hydroxyphenyl)benzotriazole compounds, 2-hydroxybenzophenone compounds, acrylate, water-soluble or hydrophobic metal salts, organometallic compounds, metal complexes, hindered amine compounds (including TEMPO compound), 2-(2-hydroxyphenyl)-1,3,5-triazine compound, metal inactivating agents, phosphite compounds, phosphonite compounds, hydroxyamine compounds, nitron compounds, peroxide scavengers, polyamide stabilizers, polyether compounds, basic assistant stabilizers, nucleating agents, benzofuranone compounds, indolinone compounds, phosphine compounds, polyamine compounds, thiourea compounds, urea compounds, hydrazide compounds, amidine compounds, sugar compounds, hydroxybenzoic acid compounds, dihydroxybenzoic acid compounds and trihydroxybenzoic acid compounds.

Among these compounds, it is preferably to simultaneously use at least one compound selected from alkylated phenolic compounds, compounds having two or more thioether linkages, bisphenol compounds, ascorbic acid, amine antioxidants, water-soluble or hydrophobic metal salts, organometallic compounds, metal complexes, hindered amine compounds, polyamine compounds, thiourea compounds, hydrazide compounds, hydroxybenzoic acid compounds, dihydroxybenzoic acid compounds and trihydroxybenzoic acid compounds.

Examples of such compounds include those described in JP-A Nos. 2002-307822, 10-182621, 2001-260519, JP-B Nos. 4-34953, 4-34513, JP-A No. 11-170686, JP-B No. 4-34512, EP1138509, JP-A Nos. 60-67190, 7-276808, 2001-94829, 47-10537, 58-111942, 58-212844, 59-19945, 59-46646, 59-109055, 63-53544, JP-B Nos. 36-10466, 42-26187, 48-30492, 48-31255, 48-41572, 48-54965, 50-10726, U.S. Pat. Nos. 2,719,086, 3,707,375, 3,754,919, 4,220,711, JP-B Nos. 45-4699, 54-5324, European Patent Laid-Open Nos. 223739, 309401, 309402, 310551, 310552 and 459416, German Patent Laid-Open No. 3435443, JP-A Nos. 54-48535, 60-107384, 60-107383, 60-125470, 60-125471, 60-125472, 60-287485, 60-287486, 60-287487, 60-287488, 61-160287, 61-185483, 61-211079, 62-146678, 62-146680, 62-146679, 62-282885, 62-262047, 63-051174, 63-89877, 63-88380, 66-88381, 63-113536, 63-163351, 63-203372, 63-224989, 63-251282, 63-267594, 63-182484, 1-239282, 2-262654, 2-71262, 3-121449, 4-291685, 4-291684, 5-61166, 5-119449, 5-188687, 5-188686, 5-110490, 5-1108437, 5-170361, JP-B Nos. 48-43295, 48-33212, U.S. Pat. Nos. 4,814,262 and 4,980,275.

The other components may be used alone or as a mixture of two or more thereof. The other components may be added after being rendered water-soluble or dispersible, or may be formed into a polymer dispersion, an emulsion or droplets, or encapsulated in microcapsules. When the other components are added, their amount is preferably 0.01 to 10 g/m$^2$.

In the invention, the ink receiving layer coating solution can contain a surfactant. The surfactant used may be a cationic, anionic, nonionic, amphoteric, fluorine or silicone surfactant. These may be used alone or as a mixture of two or more thereof.

The nonionic surfactant includes polyoxyalkylene alkyl ethers and polyoxyalkylene alkyl phenyl ethers (for example, diethylene glycol monoethyl ether, diethylene glycol diethyl ether, polyoxyethylene lauryl ether, polyoxyethylene stearyl ether, polyoxyethylene nonyl phenyl ether, etc.), oxyethylene-oxypropylene block copolymers, sorbitan fatty esters (for example, sorbitan monolaurate, sorbitan monooleate, sorbitan trioleate, etc.), polyoxyethylene sorbitan fatty esters (for example, polyoxyethylene sorbitan monolaurate, polyoxyethylene sorbitan monooleate, polyoxyethylene sorbitan trioleate, etc.), polyoxyethylene sorbitol fatty esters (for example, polyoxyethylene sorbitol tetraoleate, etc.), glycerin fatty esters (for example, glycerol monooleate, etc.), polyoxyethylene glycerin fatty esters (polyoxyethylene glycerin monostearate, polyoxyethylene glycerin monooleate, etc.), polyoxyethylene fatty esters (polyethylene glycol monolaurate, polyethylene glycol monooleate, etc.), polyoxyethylene alkyl amines, and acetylene glycols (for example, 2,4,7,9-tetramethyl-5-decyn-4,7-diol, and other diol ethylene oxide addition products, propylene oxide addition products), etc., among which polyoxyalkylene alkyl ethers are preferable. The nonionic surfactant can be contained in both the first and second coating solutions.

The amphoteric surfactant includes those of amino acid type, carboxy ammonium betaine type, sulfone ammonium betaine type, ammonium sulfate betaine type and imidazolium betaine type, and for example, those surfactants described in U.S. Pat. No. 3,843,368, JP-A No. 59-49535, JP-A No. 63-236546, JP-A No. 5-303205, JP-A No. 8-262742 and JP-A No. 10-282619 can be preferably used. The amphoteric surfactants are preferably amino acid amphoteric surfactants, and the amino acid amphoteric surfactants are for example derivatives of amino acids (glycine, glutamic acid, histidine, etc.) as described in JP-A No. 5-303205, and examples thereof include N-aminoacylic acid having a long acyl group introduced into it or salts thereof.

The anionic surfactant includes aliphatic acid salts (for example, sodium stearate and potassium oleate), alkyl sulfates (for example, sodium laurylsulfate and lauryl sulfate triethanolamine), sulfonates (for example, sodium dodecylbenzenesulfonate), alkylsulfosuccinates (for example, sodium dioctylsulfosuccinate), alkyl diphenyl ether disulfonates, alkyl phosphates, etc.

The cationic surfactant includes alkylamine salts, quaternary ammonium salts, pyridinium salts, imidazolium salts, etc.

The fluorine surfactant includes compounds derived from intermediates having a perfluoroalkyl group by a method such as electrolytic fluorination, telomerization or oligomerization. For example, mention is made of perfluoroalkyl sulfonates, perfluoroalkyl carboxylates, perfluoroalkyl ethylene oxide addition products, perfluoroalkyl trialkyl ammonium salts, perfluoroalkyl group-containing oligomers, perfluoroalkyl phosphates, etc.

The silicone surfactant is preferably an organic group-modified silicone oil which can have a siloxane structure modified at side chains, both ends or one end with organic groups. The organic group modification includes amino modification, polyether modification, epoxy modification, carboxyl modification, carbinol modification, alkyl modification, aralkyl modification, phenol modification and fluorine modification.

The content of the surfactant in the ink receiving layer coating solution is preferably 0.001 to 2.0%, and more preferably 0.01 to 1.0%. When two or more solutions are used as the ink receiving layer coating solution, the surfactant is added preferably to the respective coating solutions.

The ink receiving layer in the invention preferably contains a high-boiling organic solvent for prevention of cracking and curling, and as the high-boiling organic solvent, a water-soluble or hydrophobic organic compound having a boiling point of 150° C. or more at normal pressures can be contained, and may be a low molecule or a polymer which may be liquid or solid at room temperature.

[Ink Jet Recording Medium and Its Production]

(Support)

As the support in the ink jet recoding medium in the invention, either a transparent support made of a transparent material such as plastics or an opaque support made of an opaque material such as paper can be used. A transparent support or a highly glossy opaque support is used preferably in order to sufficiently utilize the transparency of the ink receiving layer. A read only optical disk such as CD-ROM and DVD-ROM, a write once type optical disk such as CD-R and DVD-R, or a rewrite type optical disk can be used as the support to provide the label surface with the ink receiving layer.

Preferable examples of the support include resin-coated paper provided with a thermoplastic resin layer on both sides of an opaque material such as paper, for example resin-coated paper provided with a thermoplastic resin layer on both sides of a highly glossy paper base material, such as coated paper, cast coated paper, and baryta paper used for silver salt photograph, as well as resin coated paper used for silver salt photograph.

The resin coated paper is described in detail. The base paper of this resin coated paper is produced from wood pulp as the main material, if necessary from synthetic pulp such as polypropylene or synthetic fibers such as nylon or polyester, in addition to wood pulp. As the wood pulp, LBKP, LBSP, NBKP, NBSP, LDP, NDP, LUKP and NUKP can be used, but LBKP, NBSP, LBSP, NDP and LDP containing a larger amount of short fibers are used preferably in a larger amount. The content of LBSP and/or LDP is preferably 10 to 70% by mass. As the pulp, chemical pulp (sulfate pulp and sulfite pulp) of less impurity is preferably used, and pulp whose whiteness was improved by bleaching is also useful.

The base paper can incorporate sizing agents such as higher fatty acids and alkyl ketine dimers, white pigments such as calcium carbonate, talc and titanium oxide, paper strength enhancers such as starch, polyacrylamide and polyvinyl alcohol, fluorescent whitening agents, water retainers such as polyethylene glycol, dispersants, and softeners such as quaternary ammonium.

The freeness of the pulp used in paper manufacturing is preferably 200 to 500 ml according to provisions of CSF, and the fiber length after beating is preferably 30 to 70% in terms of % by mass of 24- and 42-mesh residues in total as prescribed in JIS P-8207. 4-Mesh residues are preferably 20% by mass or less. The basis mass of the base paper is preferably 30 to 250 g, particularly preferably 50 to 200 g. The thickness of the base paper is preferably 40 to 250 μm. The base paper can be endowed with high smoothness by calendering during or after paper manufacturing. The density of the base paper is generally 0.7 to 1.2 $g/m^2$ (JIS P-8118). The rigidity of the base paper is preferably 20 to 200 g under the conditions prescribed in JIS P-8143.

The surface of the base paper may be coated with a surface sizing agent, and the usable surface sizing agent is the one that can be added to the above base paper. The pH of the base paper, when measured by a hot water extraction method prescribed in JIS P-8113, is preferably 5 to 9.

Generally, the obverse and reverse of the base paper are coated with polyethylene. The polyethylene is mainly low-density polyethylene (LDPE) and/or high-density polyethylene (HDPE), but LLDPE and polypropylene can also be partially used.

In particular, the polyethylene layer at the side where the ink receiving layer is to be formed is preferably the one whose opaqueness, whiteness and hue have been improved by adding rutile or anatase type titanium oxide, a fluorescent brightener and ultramarine to polyethylene as is widely conducted for photographic paper. The content of titanium oxide is preferably about 3 to 20% by mass, and more preferably 4 to 13% by mass, based on an amount of the polyethylene. The thickness of the polyethylene layer is not particularly limited, but each of the front and reverse layers is preferably 10 to 50 μm in thickness. For conferring the adhesiveness of the polyethylene layer to the ink receiving layer, the polyethylene layer may be provided with a prime coat. The prime coat is preferably aqueous polyester, gelatin or PVA. The thickness of the prime coat is preferably 0.01 to 5 μm.

The polyethylene-coated base paper can be used not only as glossy paper but also as paper having a matted surface or a knitted silk-like surface such as on usual photographic paper by embossing it upon coating by melt-extrusion of polyethylene onto the surface of the base paper.

The support can be provided with a back coat layer to which components such as a white pigment, an aqueous binder and other components can be added. The white pigment includes, for example, white inorganic pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrous halloysite, magnesium carbonate and magnesium hydroxide, and organic pigments such as styrene plastic pigment, acrylic plastic pigment, polyethylene, microcapsules, urea resin and melamine resin.

The aqueous binder used in the back coat layer includes, for example, water-soluble polymers such as a styrene/maleate copolymer, a styrene/acrylate copolymer, polyvinyl alcohol, silanol-modified polyvinyl alcohol, starch, cationic starch, casein, gelatin, carboxymethyl cellulose, hydroxyethyl cellulose and polyvinyl pyrrolidone, and water-dispersible polymers such as styrene butadiene latex and acrylic emulsion. Other components contained in the back coat layer include a defoaming agent, a foaming inhibitor, a dye, a fluorescent brightener, a preservative, a water-resistance conferring agent, etc.

If necessary, the support may be composed of a highly glossy film (which may be subjected to surface calendering) rendered opaque by adding a white pigment, etc. to a plastic film made of polyesters such as polyethylene terephthalate (PET), cellulose esters such as nitrocellulose, cellulose acetate and cellulose acetate butyrate, as well as polysulfone, polyphenylene oxide, polyimide, polycarbonate and polyamide, or the support may be provided with a polyolefin coating layer containing or not containing a white pigment on the surface of the paper support, transparent support, or highly glossy film containing a white pigment, etc. White pigment-containing foamed polyester film (for example, foamed PET containing fine polyolefin particles and having voids formed by stretching) may also be used.

The thickness of the support is not particularly limited, but is preferably 50 to 300 μm for handlability. The surface of the support may have been subjected to corona discharge treatment, glow discharge treatment, flame treatment, UV irradiation treatment, etc. in order to improve wetting properties and adhesiveness.

(Preparation of the Ink Jet Recording Medium)

The ink jet recording medium of the invention is prepared by coating at least one side of a support with the ink receiving layer coating solution to form an ink receiving layer. The ink receiving layer is preferably cured by crosslinking.

To cure the ink receiving layer by crosslinking, there are a method of adding a crosslinking agent to the ink receiving layer coating solution and a method of providing a crosslinking agent-containing layer adjacent to a coating layer of the ink receiving layer coating solution containing or not containing a crosslinking agent, to diffuse the crosslinking agent from the adjacent layer to the coating layer. As the latter method, there is a method which involves applying a crosslinking agent-containing coating solution to a support and then applying the ink receiving layer coating solution thereto, or applying the ink receiving layer coating solution to a support and then applying a crosslinking agent-containing coating solution (overcoat, dipping, etc.). Alternatively, the adjacent layer may be formed simultaneously with a coating layer of the ink receiving layer coating solution (formation of a double layer).

Curing of a coating layer of the ink receiving layer coating solution by crosslinking is carried out preferably by adding a basic solution having a pH of 7 or more to the coating layer either (1) while the coating layer is being formed or (2) before the coating layer exhibits a decreasing rate of drying during drying of the layer. The crosslinking agent may be contained in the ink receiving coating layer and/or the basic solution.

The basic solution having a pH of 7 or more can contain a crosslinking agent and a mordant if necessary. The pH of the basic solution is 7 or more, preferably 8 or more, more preferably 8.5 or more, and still more preferably 9.0 or more. When the pH value is less than 7, the crosslinking reaction, by the crosslinking agent, of a water-soluble polymer contained in the ink receiving layer coating solution does not sufficiently proceed, thus generating failure such as cracking on the ink receiving layer. The basic solution includes at least basic materials (for example, ammonia, primary amines (ethylamine, polyallylamine, etc.), secondary amines (dimethylamine, triethylamine, etc.), tertiary amines (N-ethyl-N-methylbutylamine, etc.), alkali metal or alkaline earth metal hydroxides and/or salts of the basic materials.

The basic solution can be prepared by adding, for example, a basic compound polyallylamine (for example, 1 to 5%) and if necessary p-toluenesulfonic acid (for example, 0.5 to 3%) and ammonium chloride (for example, 0.05 to 2%) to deionized water and then stirring them sufficiently. The term "%" in the composition refers to % by mass of a solid content.

This simultaneous application method (1) (double-layer application method) of applying the basic solution simultaneously with formation of a coating layer of the ink receiving layer coating solution can be carried out by a coating method using e.g. an extrusion die coater or a curtain flow coater. The coating layer formed after the simultaneous application is dried by heating the layer generally at a temperature of 15 to 150° C. for 0.5 to 10 minutes, preferably at a temperature of 40 to 100° C. for 0.5 to 5 minutes.

When the simultaneous application is carried out by using e.g. an extrusion die coater, the simultaneously discharged two coating solutions form a double layer in the vicinity of a discharge orifice of the extrusion die coater, that is, before transfer to a support, and is then applied in the form of a double layer onto the support. The two coating solutions in the form of two layers layered before application onto the support undergo crosslinking reaction easily in the interface between the two solutions during transfer to the support, and thus the discharged two solutions are mixed and thickened easily in the vicinity of the discharge orifice of the extrusion die coater, to cause a hindrance sometimes in the coating operation. In the simultaneous application described above, therefore, a triple layer is preferably applied by simultaneously applying the ink receiving layer coating solution and the basic solution, together with a barrier layer solution (interlayer solution) sandwiched between the two solutions.

The barrier layer solution can be selected without particular limitation. For example, an aqueous solution containing a very small amount of a water-soluble resin, or water, can be used. The water-soluble resin used for the purpose of thickening, etc. for improving coating properties includes, for example, cellulose resin (for example, hydroxypropylmethyl cellulose, methyl cellulose and hydroxyethylmethyl cellulose) and polymers such as polyvinyl pyrrolidone and gelatin. The barrier layer may also contain the mordant.

The phrase "before the coating layer exhibits a decreasing rate of drying" in the method (2) of applying the basic solution before the coating layer of the ink receiving layer coating solution exhibits a decreasing rate of drying during drying of the layer refers to a period of several minutes just after application of the ink receiving layer coating solution, and during this period, the content of the solvent (dispersing medium) in the coating layer shows the phenomenon "constant rate of drying" in which the content is decreased in proportion to time. The time during which the "constant rate of drying" is kept is described in Handbook of Chemical Engineering (in Japanese) (pp. 707-712, published by Maruzen Co., Ltd. in Oct. 25, 1980).

The coating layer of the ink receiving layer coating solution is dried generally at a temperature of 40 to 180° C. for 0.5 to 10 minutes (preferably 0.5 to 5 minutes) until the coating layer exhibits a decreasing rate of drying. Usually this drying time, though varied depending on the application amount, is preferably in the above range.

In this method, the ink receiving layer coating solution can be applied by a known coating method with e.g. an extrusion die coater, an air doctor coater, a bread coater, a rod coater, a knife coater, a squeeze coater, a reverse roll coater or a bar coater.

In the case of the above-mentioned (2), the method of applying the basic solution to a coating layer of the ink receiving layer coating solution includes (i) a method of further applying the basic solution to the coating layer, (ii) a method of spraying with a spray, and (iii) a method of dipping a support having the coating layer formed thereon into the basic solution. As the coating method (i), a known coating method with e.g. a curtain flow coater, an extrusion die coater, an air doctor coater, a bread coater, a rod coater, a knife coater, a squeeze coater, a reverse roll coater or a bar coater can be used. It is however preferable to utilize a method of using an extrusion die coater, a curtain flow coater or a bar coater such that the coater is not directly contacted with the first coating layer previously formed.

After application of the basic solution, the layer is cured generally by heating at 40 to 180° C. for 0.5 to 30 minutes. In particular, heating at 40 to 150° C. for 1 to 20 minutes is preferable.

After the ink receiving layer is formed on the support, the ink receiving layer can be subjected to calendering through nip rolls under heating and pressure with e.g. a supercalender, a gloss calender or the like to improve surface smoothness, gloss, transparency and coating strength. However, calendering can cause a reduction in porosity (that is, a reduction in ink absorptivity), and should thus be conducted under predetermined conditions where porosity is scarcely reduced.

The temperature of the rolls in calendering is preferably 30 to 150° C., and more preferably 40 to 100° C. The linear pressure between the rolls in calendering is preferably 50 to 400 kg/cm, and more preferably 100 to 200 kg/cm.

Preferably, the ink receiving layer is excellent in transparency. That is, the transparency of the ink receiving layer formed on a transparent film support is preferably 30% or less, and more preferably 20% or less, in terms of haze. The haze can be measured with a haze meter (HGM-2DP manufactured by Suga Test Instrument Co., Ltd.).

A fine polymer particle dispersion may be added to the layer (for example, the ink receiving layer) constituting the ink jet recording medium of the invention. The fine polymer particle dispersion is used for the purpose of improving physical properties of the coating, such as stabilization of dimensions, prevention of curling, prevention of adhesion and prevention of cracking in the coating. The fine polymer particle dispersion is described in JP-A Nos. 62-245258, 62-1316648 and 62-110066. When a dispersion of fine polymer particles having a low glass transition point (40° C. or less) is added to the ink receiving layer, the cracking and curling of the layer can be prevented. On the other hand, curling can be prevented by adding a dispersion of fine polymer particles having a high glass transition point to the back layer.

EXAMPLES

Hereinafter, the present invention is described in more detail by reference to the Examples. However, the Examples should not be construed to limit the scope of the invention. In the Examples, the terms "parts" and "%" refer to "parts by mass" and "% by mass", respectively; and the terms "average molecular weight" and "degree of polymerization" refer to "weight average molecular weight" and "weight average degree of polymerization", respectively.

Examples 1 to 3 and Comparative Examples 1 to 4

Preliminary Dispersion, Fine Particle Dispersion, and Ink Receiving Layer Coating Solution Example 1

<Preliminary Silica Dispersion>

0.06 part of isopropyl alcohol and 1.5 parts of a cationic polymer having an I/O value of 1.89 (40% aqueous solution, Chemistat 7005, manufactured by Sanyo Chemical Industries, Ltd.) were added to 55 parts of deionized water. While this solution was stirred at a number of revolutions of 9000 rpm with a dissolver (manufactured by Tokushu Kikai Kogyo Co., Ltd.), 10 parts of fine fumed silica particles (Rheoloseal QS-30 with an average primary particle diameter of 7 nm, manufactured by Tokuyama Corp.) were added to the solution and stirred (kneaded) for 30 minutes to give a preliminary silica dispersion 1.

The viscosity of the preliminary silica dispersion was measured with a Brookfield viscometer. The result is shown in Table 1.

<Fine Silica Dispersion>

The preliminary dispersion 1 thus obtained was dispersed finely with a sand mill-type dispersing machine KD-P (Shinmaru Enterprises Corporation) to prepare a fine silica dispersion 1.

<Ink Receiving Layer Coating Solution>

An aqueous solution consisting of the following components was added to the fine silica dispersion described above and stirred at a number of revolutions of 8000 rpm for 20 minutes with a dissolver (Tokushu Kikai Kogyo Co., Ltd.) to give an ink receiving layer coating solution 1.

| | |
|---|---|
| Polyvinyl alcohol, 8% aqueous solution (PVA 124, degree of saponification 98.5%, degree of polymerization 2400 produced by Kuraray Co., Ltd.) | 27.8 parts |
| Boric acid | 0.4 parts |
| Polyoxyethylene lauryl ether (Emulgen 109P (10% aqueous solution), HLB 13.6, produced by Kao Corporation) | 1.2 parts |
| Deionized water | 10 parts |

Example 2

A preliminary dispersion 2 was obtained in the same manner as in Example 1 except that a cationic polymer having an I/O value of 1.73 having a following structure was used in place of the cationic polymer in Example 1. The viscosity was measured in the same manner as in Example 1. A fine particle dispersion 2 was prepared in the same manner as in Example 1, and an ink receiving layer coating solution 2 was prepared therefrom and measured for its viscosity. The result is shown in Table 1.

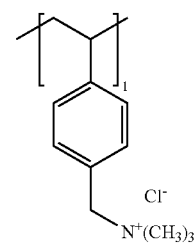

Example 3

A preliminary dispersion 3 was obtained in the same manner as in Example 1 except that a cationic polymer having an I/O value of 2.38 having a following structure was used in place of the cationic polymer in Example 1. The viscosity was measured in the same manner as in Example 1. A fine particle dispersion 3 was prepared in the same manner as in Example 1, and an ink receiving layer coating solution 3 was prepared therefrom and measured for its viscosity. The result is shown in Table 1.

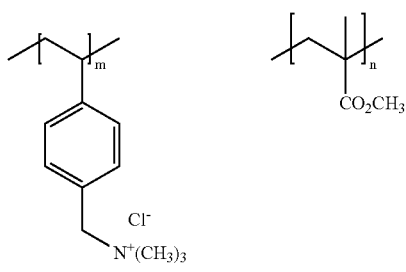

m:n = 50:50

Comparative Example 1

A preliminary dispersion 4 was obtained in the same manner as in Example 1 except that isopropyl alcohol was not added. The viscosity was measured in the same manner as in Example 1. A fine particle dispersion 4 was prepared in the same manner as in Example 1, and an ink receiving layer coating solution 4 was prepared therefrom and measured for its viscosity. The result is shown in Table 1.

Comparative Example 2

A preliminary dispersion 5 was obtained in the same manner as in Example 2 except that isopropyl alcohol was not added. The viscosity was measured in the same manner as in Example 2. A fine particle dispersion 5 was prepared in the same manner as in Example 2, and an ink receiving layer coating solution 5 was prepared therefrom and measured for its viscosity. The result is shown in Table 1.

Comparative Example 3

A preliminary dispersion 6 was obtained in the same manner as in Example 3 except that isopropyl alcohol was not added. The viscosity was measured in the same manner as in Example 3. A fine particle dispersion 6 was prepared in the same manner as in Example 3, and an ink receiving layer coating solution 6 was prepared therefrom and measured for its viscosity. The result is shown in Table 1.

Comparative Example 4

A preliminary dispersion 7 was obtained in the same manner as in Example 1 except that a cationic polymer having an I/O value of 4.3 (cationic polymer P-1 described in JP-A No. 2002-79741) was used in place of the cationic polymer in Example 1. The viscosity was measured in the same manner as in Example 1. A fine particle dispersion 7 was prepared in the same manner as in Example 1, and an ink receiving layer coating solution 7 was prepared therefrom and measured for its viscosity. The result is shown in Table 1.

TABLE 1

| | I/O value of cationic polymer | Addition of alcohol | Viscosity of preliminary silica dispersion (mPa · s) | Viscosity of ink receiving layer coating solution (mPa · s) |
|---|---|---|---|---|
| Example 1(1) | 1.89 | Yes | 150 | 86 |
| Example 2(2) | 1.73 | Yes | 250 | 95 |
| Example 3(3) | 2.38 | Yes | 95 | 81 |
| Comparative Example 1(4) | 1.89 | No | 335 | 186 |
| Comparative Example 2(5) | 1.73 | No | 540 | 150 |
| Comparative Example 3(6) | 2.38 | No | 260 | 120 |
| Comparative Example 4(7) | 4.30 | Yes | 850 | 350 |

Note
The number in parentheses after the example number or comparative example number refers to the number of the preliminary dispersion and ink receiving layer coating solution.

As shown in Table 1, the preliminary silica dispersions 1 to 3 of the invention have low viscosity, and the ink receiving layer coating solutions 1 to 3 using such dispersions also have low viscosity and are excellent in coating properties. On the other hand, the preliminary dispersions 4 to 7 wherein the cationic polymer has an I/O value of 5 or more or alcohol is not added have high viscosity, and their corresponding ink receiving layer coating solutions 4 to 7 also have high viscosity.

Example 4 and Comparative Examples 5 and 6

Ink Jet Recording Medium

<Preparation of a Support>

Wood pulp composed of LBKP was regulated to a Canadian freeness of 300 ml with a disk refiner. To this pulp slurry were added 1.3% (based on the pulp slurry) cationic starch (CATO 304L manufactured by Nippon NCS), 0.145% anionic polyacrylamide (Polyacron ST-13 manufactured by Seiko Kagaku), 0.285% alkyl ketene dimer (Size Pain K manufactured by Araki Kagaku), 0.285% epoxylated behenic amide, and 0.2% polyamide polyamine epichlorohydrin (Arafix 100 manufactured by Araki Kagaku).

The pulp slurry thus prepared was used to prepare a paper by a wire paper machine, and a photographic emulsion-coating surface of the web was pressed via a dryer canvas against a drum dryer cylinder and then dried, and polyvinyl alcohol (KL-118 manufactured by Kuraray) was applied in an amount of 1 g/m$^2$ onto both sides of the paper by a size press, then dried and subjected to calendering. From the paper having a basis weight of 166 g/m$^2$, a base paper sheet of 160 μm in thickness was obtained.

The wire surface (reverse) of the resultant base paper was subjected to corona discharge treatment and then coated with high-density polyethylene to a thickness of 25 μm by a melt extrusion machine, to form a resin layer having a matted surface (hereinafter, the surface of the resin layer is referred to as "reverse"). The resin layer at the side of this reverse was further subjected to corona discharge treatment and then coated, in an amount of 0.2 g/m$^2$ on a dry weight basis, with a dispersion containing, as an antistatic agent, aluminum oxide (Alumina Sol 100 manufactured by Nissan Chemical Industries, Ltd.) and colloidal silicon dioxide (Snowtex O manufactured by Nissan Chemical Industries, Ltd.) dispersed in the ratio of 1:2 (ratio by weight) in water.

The felt surface (obverse) at the side where the resin layer was not disposed was subjected to corona discharge treatment, and then low-density polyethylene having a MRF (melt flow rate) of 3.8, containing 10% (based on the polyethylene) anatase type titanium dioxide, 60 mg/m$^2$ ultramarine (manufactured by Tokyo Ink Co., Ltd.) and 13 mg/m$^2$ fluorescent whitening agent Whiteflour PSN conc (manufactured by Nippon Kagaku Kogyo Co., Ltd.) was melt-extruded to a thickness of 25 μm onto the felt surface by a melt extrusion machine, to form a highly gloss thermoplastic resin layer on the obverse of the base paper (hereinafter, this highly glossy surface is referred to as "obverse") to prepare a support.

<Preparation of a Basic Solution Having a pH of 7 or More>

The following components were mixed to prepare a basic solution having a pH of 7 or more.

| | |
|---|---|
| Boric acid (crosslinking agent) | 0.65 parts |
| Polyallylamine (PAA-03 (20% aqueous solution), a mordant manufactured by Nittobo) | 15 parts |
| Deionized water | 72.25 parts |
| Ammonium chloride (surface pH regulating agent) | 0.1 parts |

-continued

| | |
|---|---|
| Polyoxyethylene lauryl ether (surfactant) (Emulgen 109P, 2% aqueous solution, HLB 13.6, manufactured by Kao Corporation) | 10 parts |
| Fluorine surfactant (Megaface F1405 (10% aqueous solution) manufactured by Dainippon Ink and Chemicals, Incorporated) | 2.0 parts |

<Preparation of an Ink Jet Recording Medium>

After the obverse of the support was subjected to corona discharge treatment, the ink receiving layer coating solution 1, 4 or 7 was applied in an amount of 200 ml/m$^2$ onto the obverse of the support by an extrusion die coater (coating step), and dried at 80° C. with a hot-air dryer (at a rate of 3 to 8 m/sec) until the solid content of the coating layer was reduced to 20%. The coating layer showed a constant drying rate for this period. Just thereafter, the support was dipped in the basic solution having a pH of 7 or more having the above composition for 30 seconds, to permit the basic solution to adhere in an amount of 20 g/m$^2$ to the coating layer (step of applying the mordant solution), and then dried at 80° C. for 10 minutes (drying step). The ink jet recording media 1, 4 and 7 of the invention provided with the ink receiving layer of 32 μm in thickness after drying were thus formed.

The resulting ink jet recording media were evaluated as follows. The results are shown in Table 2.

<Ink Blurring with Time>

An ink jet printer (trade name: PM-950C, manufactured by Seiko Epson Corporation) and inks were used to print lines (line width 0.28 mm) of a magenta ink and a black ink alternately disposed in a checked pattern on the ink jet recording sheet, and then measured for visual density (ODf) by X-rite 310TR (manufactured by X-rite Incorporated). After printing, the ink jet recording sheet was filed and then maintained for 3 days in a thermostatic humidistat chamber at 30° C. in 80% relative humidity, and the visual density was measured again (ODt), and ink blurring with time was evaluated in terms of an increase in visual density ((ODt/ODf)×100). A lower increase in density indicates that blurring with time is suppressed.

TABLE 2

| | Ink receiving layer coating solution number | Ink blurring |
|---|---|---|
| Example 4 | 1 | 145 |
| Comparative Example 6 | 7 | 180 |

As can be seen from Table 2, the ink jet recording medium prepared using the ink receiving layer coating solution prepared using the preliminary dispersion and the fine silica dispersion of the invention shows less ink blurring.

The preliminary silica dispersion of the invention has low viscosity, and when the preliminary silica dispersion is further finely dispersed to prepare a fine silica dispersion, the preliminary silica dispersion obtained in the manner described above is excellent in handlability to facilitate the dispersion treatment. The ink receiving layer coating solution prepared using the preliminary silica dispersion and the fine silica dispersion of the invention is excellent in coating properties with low viscosity. An ink jet recording medium prepared using the ink receiving layer coating solution of the invention shows less ink blurring.

What is claimed is:

1. A preliminary silica dispersion to be used in an ink receiving layer coating solution for forming an ink receiving layer of an ink jet recording medium, the preliminary silica dispersion comprising fumed silica, a cationic polymer having an I/O value of 2.4 or less, and alcohol.

2. The preliminary silica dispersion of claim 1, which is produced by kneading the fumed silica with the cationic polymer having an I/O value of 2.4 or less and the alcohol.

3. The preliminary silica dispersion of claim 1, wherein an average primary particle diameter of the fumed silica is 5 to 30 nm.

4. The preliminary silica dispersion of claim 1, wherein the cationic polymer is contained in the preliminary silica dispersion in an amount of 1 to 15% by mass based on an amount of the fumed silica.

5. The preliminary silica dispersion of claim 1, wherein the alcohol is contained in the preliminary silica dispersion in an amount of 0.1 to 20% by mass based on a solid content of the cationic polymer.

6. The preliminary silica dispersion of claim 1, further comprising at least one of a nonionic surfactant and a cationic surfactant.

7. The preliminary silica dispersion of claim 1, further comprising a water-miscible organic solvent.

8. A fine silica dispersion to be used in an ink receiving layer coating solution for forming an ink receiving layer of an ink jet recording medium, wherein the fine silica dispersion is prepared by further finely dispersing the preliminary silica dispersion of claim 1.

9. The fine silica dispersion of claim 8, wherein a surface of fine fumed silica particles is treated with a silane coupling agent.

10. An ink receiving layer coating solution for forming an ink receiving layer of an ink jet recording medium, comprising the fine silica dispersion of claim 8 and at least a water-soluble resin.

11. The ink receiving layer coating solution of claim 10, wherein the water-soluble resin is polyvinyl alcohol-based resin.

12. The ink receiving layer coating solution of claim 11, wherein the polyvinyl alcohol-based resin has a degree of saponification of 90% or more.

13. The ink receiving layer coating solution of claim 10, wherein a ratio by mass of the fumed silica to the water-soluble resin is 1.5 to 10.

14. The ink receiving layer coating solution of claim 10, further comprising a crosslinking agent.

15. The ink receiving layer coating solution of claim 14, wherein the crosslinking agent is a boron compound.

* * * * *